United States Patent
Curry

Patent Number: 6,014,831
Date of Patent: Jan. 18, 2000

[54] SAFE HOOK PROTECTOR FOR FISHING HOOKS

[75] Inventor: Sallie B. Curry, 570 S. Main, Pixley, Calif. 93256

[73] Assignee: Sallie B. Curry, Pixley, Calif.

[21] Appl. No.: 09/019,167

[22] Filed: Feb. 5, 1998

[51] Int. Cl.[7] ................................................. A01K 87/00
[52] U.S. Cl. ............................................................ 43/25.2
[58] Field of Search ................................. 43/42.4, 43.2, 43/25.2

[56] References Cited

U.S. PATENT DOCUMENTS

| | | | |
|---|---|---|---|
| D. 220,432 | 4/1971 | Leroue | 43/25.2 |
| 404,747 | 6/1889 | Teed | 43/42.4 |
| 1,920,478 | 8/1933 | Norton | 43/43.2 |
| 2,514,645 | 7/1950 | Jardine | 43/25.2 |
| 2,733,533 | 2/1956 | Standard | 43/25.2 |
| 2,802,293 | 8/1957 | Flye, Sr. | 43/25.2 |
| 3,141,258 | 7/1964 | Mayer | 43/42.3 |
| 3,670,445 | 6/1972 | Borger | 43/42.4 |
| 3,815,273 | 6/1974 | Perkins | 43/25.2 |
| 3,839,811 | 10/1974 | Hopkins | 43/25.2 |
| 3,971,151 | 7/1976 | Banner | 43/24 |
| 4,068,400 | 1/1978 | McCoy | 43/53.5 |
| 4,452,003 | 6/1984 | Deutsh et al. | 43/25.2 |
| 4,597,216 | 7/1986 | Bjorshol | 43/43.2 |
| 4,667,433 | 5/1987 | Thompson, Jr. | 43/25.2 |
| 4,730,409 | 3/1988 | Mitchell et al. | 43/25 |
| 4,879,832 | 11/1989 | Nelson | 43/25.5 |
| 4,884,357 | 12/1989 | Clifford | 43/25.2 |
| 4,944,111 | 7/1990 | Daniel | 43/25.2 |
| 5,020,264 | 6/1991 | Demski | 43/25.2 |
| 5,056,256 | 10/1991 | Truax | 43/25.2 |
| 5,123,199 | 6/1992 | Lysohir | 43/57.1 |
| 5,172,509 | 12/1992 | Motovik | 43/25.2 |
| 5,448,851 | 9/1995 | Nyberg | 43/25.2 |
| 5,535,541 | 7/1996 | Fisher | 43/57.1 |

Primary Examiner—Michael J. Carone
Assistant Examiner—Fredrick T. French, III

[57] ABSTRACT

A safe hook protector is disclosed having a hard plastic hook cover capable of engaging, receiving and enveloping the barbed end of a fishing hook. The safe hook protector having a generally J-shaped body having an elongated shank receiving portion and an enclosed hook cleat cover disposed at an end thereof. The safe hook protector is capable of attachment to a fishing rod or a fishing reel where fishermen commonly attach fishing hooks while transporting a fishing pole to a fishing location. The safe hook protector is designed to prevent injuries to people and damage to property by engaging the barbed end of a fishing hook.

4 Claims, 1 Drawing Sheet

SAFE HOOK PROTECTOR FOR FISHING HOOKS

TECHNICAL FIELD

The invention pertains to an apparatus for safely transporting a fishing hook.

BACKGROUND OF THE INVENTION

Every fisherman has a large number of hooks in his tackle box for use with live and artificial bait as appropriate. The hooks are kept razor sharp at the points. Hundreds of thousands of injuries occur each year when fishermen are snagged with a hook that has been left on a rod. Fishing hooks also account for damage to vehicle upholstery and a fisherman's clothing. If a hook becomes deeply imbedded in the skin and muscle, the only way to remove it without extensive damage to the injured area is to push the shank in and up until the tip and barb can be cut off with wire snips and the remainder of the hook and shank pulled out. This procedure ordinarily takes place in a doctor's office or an emergency room.

BRIEF SUMMARY OF THE INVENTION

The CURRY'S SAFE HOOK PROTECTOR comprises a hook-shaped, hard plastic hook cover that completely encloses the barb of the hook and is capable of being attached to a reel on the stainless steel cross strut above the reciprocating line guide in a bait casting reel, on the handle of a spin cast or spinning reel, or alternatively, on a rod eyelet where fisherman now place their hooks.

The apparatus is a plastic, hook shaped cover or container that can easily be engaged with a hook while the hook remains attached to the fishing line of a fishing pole. The safe hook protector would be produced in various sizes to accommodate the various sizes of hooks available to the fisherman.

Another object of the invention is to provide a fish hook protector which is easily attached to and detached from a fishing rod or reel. The safe hook protector will be sufficiently small to enable it to be kept conveniently in a pocket or a fishing tackle box and to protect the fisherman from the menacing barb without having to remove the hook from the fishing line of the rod and reel.

Because the problems that the safe hook protector addresses and solves through its use and application, consumers will find such an invention attractive and appealing.

DETAILED DESCRIPTION OF THE INVENTION

Figure 1:
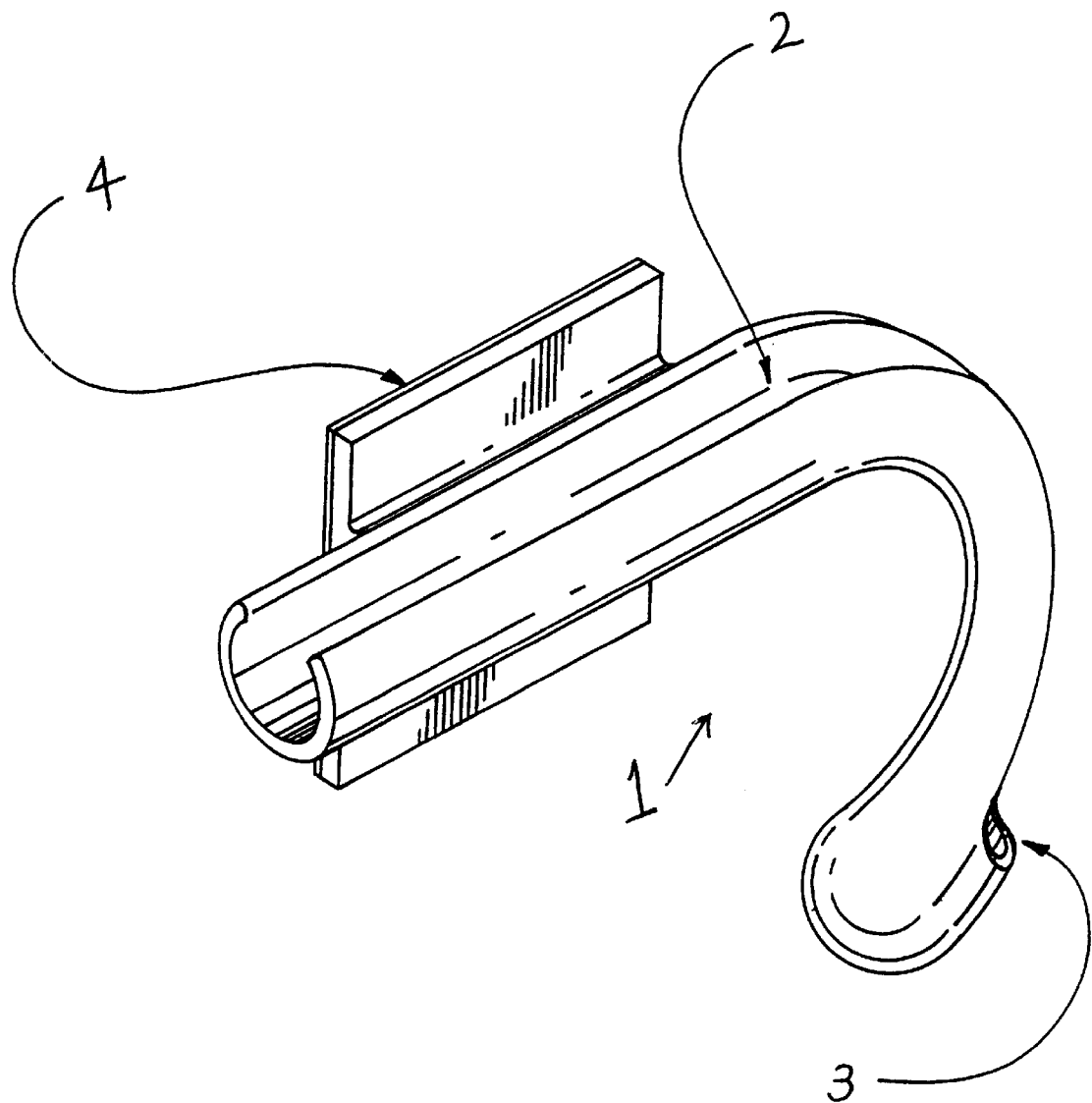
FIG. 1 is a perspective view of the safe hook protector disclosing the hard plastic hook cover which encloses the barb of the hook.

The safe hook protector 1 is formed from molded plastic material. In the preferred embodiment the plastic material is ABS™ (Acrylonitile-Butadiene-Styrene). ABS™ is manufactured by Borg Warner Chemicals and is characterized by high rigidity and impact strength, excellent abrasion and moisture resistance, and resistance to most chemicals. ABS™ is easily thermoformed and lends itself to remarkable reproduction of mold detail.

The safe hook protector 1 comprises a generally J-shaped body (shown generally in FIG. 1) which is open along an elongated shank receiving portion and a having an enclosed barb receiving portion for engaging and receiving the barb of a fishing hook. The safe hook protector 1 further comprises a flat substantially rectangular mounting surface 4 for mounting to a fishing rod or a fishing reel (not shown), having an adhesive pad attached to a side of the surface directed away from the hook retaining portion of the safe hook protector 1, for adhesively attaching and detaching the safe hook protector 1 to a fishing rod or reel. The mounting surface 4 is integrally formed adjacent the hook retaining portion during the molding process.

The safe hook protector 1 is designed to engage a fishing hook (the common and well known features of a standard fishing hook are not shown) about the fishing hooks entire length having a hook shank slot 2 wherein a hook's shank including the bent or J-shaped portion of the hook is engaged. The hook shank slot 2 will envelope at least three sides of the shank portion of the hook.

The safe hook protector 1 further comprises a hook cleat cover 3 wherein the barbed end portion of a fishing hook is engaged and completely enveloped within the hook cleat cover 3. This hooked cleat cover 3 may have a hinged portion (not shown) which allows for easy insertion and removal of the fishing hook from the safe hook protector 1.

The invention having been described as to its structural features and application, it is understood that the invention is not limited to the specific features shown and described, since the invention disclosed herein comprises a preferred embodiment.

What is claimed as being new and desired to be protected by Letters Patent of the United States is as follows:

1. A safe hook protector for a fishing hook comprising a J-shaped body having
   an elongated shank receiving portion, said elongated shank receiving portion being open at a top portion thereof for receiving the shank of a fishing hook,
   an enclosed barb receiving portion for engaging, receiving and enveloping the barb of a fishing hook,
   an integrally formed flat substantially rectangular mounting surface having mounting means attached to a side of said mounting surface thereof, and said mounting surface being formed adjacent to a side surface of the elongated shank receiving portion, said mounting surface for mounting said safe hook protector to a fishing rod or a fishing reel.

2. A safe hook protector as claimed in claim 1, wherein said mounting means is an adhesive pad for releasably attaching said safe hook protector to a fishing rod or a fishing reel.

3. A safe hook protector as claimed in claim 1, wherein said safe hook protector is formed from a moldable plastic material.

4. A safe hook protector as claimed in claim 3, wherein said moldable plastic material is Acrylonitrile-Butadiene-Styrene.

* * * * *